United States Patent
Kondo

(10) Patent No.: US 9,453,096 B2
(45) Date of Patent: Sep. 27, 2016

(54) METHOD FOR PRODUCING ACRYLIC POLYMER, ACRYLIC POLYMER, AND PLASTISOL COMPOSITION

(71) Applicant: MITSUBISHI RAYON CO., LTD., Chiyoda-ku (JP)

(72) Inventor: Toru Kondo, Toyohashi (JP)

(73) Assignee: MITSUBISHI RAYON CO., LTD., Chiyoda-ku (JP)

( * ) Notice: Subject to any disclaimer, the term of this patent is extended or adjusted under 35 U.S.C. 154(b) by 128 days.

(21) Appl. No.: 14/360,205

(22) PCT Filed: Nov. 19, 2012

(86) PCT No.: PCT/JP2012/079981
§ 371 (c)(1),
(2) Date: May 22, 2014

(87) PCT Pub. No.: WO2013/077293
PCT Pub. Date: May 30, 2013

(65) Prior Publication Data
US 2014/0275378 A1    Sep. 18, 2014

(30) Foreign Application Priority Data
Nov. 22, 2011  (JP) ................. 2011-255168

(51) Int. Cl.
| | | |
|---|---|---|
| C08K 5/10 | (2006.01) | |
| C08F 220/28 | (2006.01) | |
| C08F 265/06 | (2006.01) | |
| C08L 51/06 | (2006.01) | |
| C08K 5/12 | (2006.01) | |

(52) U.S. Cl.
CPC ........... *C08F 220/28* (2013.01); *C08F 265/06* (2013.01); *C08K 5/10* (2013.01); *C08K 5/12* (2013.01); *C08L 51/06* (2013.01)

(58) Field of Classification Search
CPC ......... C08F 16/28; C08F 220/28; C08K 5/12
See application file for complete search history.

(56) References Cited

U.S. PATENT DOCUMENTS

| | | | |
|---|---|---|---|
| 6,586,516 B1 | 7/2003 | Kesselmayer et al. | |
| 6,894,108 B1 | 5/2005 | Kasai et al. | |
| 2006/0287437 A1* | 12/2006 | Ma ................ | C08F 293/005 525/242 |
| 2009/0137740 A1 | 5/2009 | Mae et al. | |
| 2010/0069566 A1 | 3/2010 | Mae | |

FOREIGN PATENT DOCUMENTS

| | | |
|---|---|---|
| EP | 1 988 107 A1 | 11/2008 |
| EP | 2 116 573 A1 | 11/2009 |
| JP | 50 115288 | 9/1975 |
| JP | 9 176578 | 7/1997 |
| JP | 2000 154297 | 6/2000 |
| JP | 2005 281630 | 10/2005 |
| WO | 01 21707 | 3/2001 |
| WO | 2007 097428 | 8/2007 |
| WO | WO 2007/097428 A1 | 8/2007 |
| WO | 2008 090906 | 7/2008 |
| WO | WO 2008/090906 A1 | 7/2008 |

OTHER PUBLICATIONS

Extended Search Report issued Apr. 21, 2015 in European patent Application No. 12852255.4.
International Search Report Issued Feb. 12, 2013 in PCT/JP12/079981 Filed Nov. 19, 2012.

\* cited by examiner

*Primary Examiner* — Mark Kaucher
(74) *Attorney, Agent, or Firm* — Oblon, McClelland, Maier & Neustadt, L.L.P

(57) ABSTRACT

Disclosed is a method for producing a plastisol acrylic polymer which can have a satisfactory adhesion property even when the heating time is short and the heating temperature is low, and which has excellent storage stability. The method comprises (1) a step of polymerizing an acrylic monomer mixture (a) to produce a polymer (A) and (2) a step of polymerizing an acrylic monomer mixture (b) in a dispersion containing the polymer (A), wherein a monomer having a hydroxy group is contained in the acrylic monomer mixture (a), a monomer having an acetoacetyl group or a block isocyanate group is contained in the acrylic monomer mixture (b), and the dissolution parameter (SA) for the polymer (A) and the dissolution parameter (SB) for a polymer (B) produced by the polymerization of the acrylic monomer mixture (b) are different from each other.

11 Claims, No Drawings

METHOD FOR PRODUCING ACRYLIC POLYMER, ACRYLIC POLYMER, AND PLASTISOL COMPOSITION

CROSS REFERENCE TO RELATED APPLICATIONS

The present application is a 35 U.S.C. §371 national stage patent application of International patent application PCT/JP2012/079981, filed on Nov. 19, 2012, published as WO/2013/077293 on May 30, 2013, the text of which is incorporated by reference, and claims the benefit of the filing date of Japanese application no. 2011-255168, filed on Nov. 22, 2011, the text of which is also incorporated by reference.

FIELD OF THE INVENTION

The present invention relates to an acrylic polymer suitable for producing a plastisol composition that exhibits excellent adhesiveness to a coated plate and excellent storage stability. The present invention also relates to a method for producing the acrylic polymer and to a plastisol composition obtained by using the acrylic polymer.

BACKGROUND ART

A plastisol composition containing a polymer and a plasticizer is used for various applications such as undercoats for automobiles, body sealers for automobiles, wallpaper, carpet backing and flooring materials, toys and the like.

When a plastisol composition containing a vinyl chloride resin is used for automobile undercoats and automobile body sealers, for example, hydrogen chloride and the like that may damage equipment are generated in a step for melting shredder dust during a process for recycling automobiles. Thus, to reduce the amount of vinyl chloride resin, a plastisol composition containing an acrylic polymer has been studied. Moreover, to respond to recent environmental issues, in coating and baking steps during the automobile coating process, the heating temperature is lowered and the baking time is reduced compared with those in a conventional process.

For example, Patent Literature 1 describes a plastisol composition which contains an acrylic polymer obtained by polymerizing a monomer having a blocked isocyanate group and which exhibits excellent adhesiveness to an electrodeposition-coated surface. Patent Literature 2 describes a plastisol composition which contains an acrylic polymer with a multilayer structure obtained by polymerizing a monomer having a hydroxyl group and which exhibits excellent storage stability.

PRIOR ART PUBLICATION

Patent Literature

Patent Literature 1: Published International Patent Application WO2007/097428
Patent Literature 2: Published International Patent Application WO2008/090906

SUMMARY OF THE INVENTION

Problem(s) to be Solved by the Invention

The acrylic polymer used for the plastisol composition described in Patent Literature 1 was not produced by polymerizing a monomer having a hydroxyl group, and the acrylic polymer used for the plastisol composition described in Patent Literature 2 was not produced by polymerizing a monomer having an acetoacetyl group or a blocked isocyanate group. Therefore, sufficient adhesiveness to an electrodeposition-coated surface may not be achieved if heating time and temperature are not sufficient.

The present invention was carried out to solve the issues described above. Namely, the objective of the present invention is to provide an acrylic polymer suitable for producing a plastisol composition which exhibits excellent storage stability and excellent adhesiveness to an electrodepositon-coated plate even when the heating time is shorter and the heating temperature is lower than in conventional applications.

Solution(s) to the Problem(s)

The present invention relates to a method for producing an acrylic polymer including step (1) for obtaining a polymer (A) by polymerizing an acrylic monomer mixture (a) and step (2) for polymerizing an acrylic monomer mixture (b) in a dispersion containing the polymer (A). In such a method for producing an acrylic polymer, a monomer having a hydroxyl group is contained in the acrylic monomer mixture (a), a monomer having an acetoacetyl group or a blocked isocyanate group is contained in the acrylic monomer mixture (b), and the solubility parameter (SA) of the polymer (A) is different from the solubility parameter (SB) of a polymer (B) obtained by polymerizing the acrylic monomer mixture (b).

Also, the present invention relates to an acrylic polymer obtained by the above production method.

In addition, the present invention relates to a plastisol composition containing the acrylic polymer and a plasticizer.

Effects of the Invention

By using an acrylic polymer produced by the method related to the present invention, a plastisol composition is obtained, having excellent adhesiveness to an electrodeposition-coated plate even when the heating time is shorter and the heating temperature is lower, while excellent storage stability is exhibited.

DETAILED DESCRIPTIONS OF THE PREFERRED EMBODIMENTS

Step (1)

Step (1) in an embodiment of the present invention is for obtaining a polymer (A) by polymerizing an acrylic monomer mixture (a).

An acrylic monomer mixture (a) used in step (1) is required to contain a monomer having a hydroxyl group. When a monomer having a hydroxyl group is contained, adhesiveness to a substrate improves even when the heating time is shorter and the heating temperature is lower. Examples of a monomer having a hydroxyl group are, for example, (meth)acrylic acid esters having a hydroxyl group such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, and dipentaerythritol hexa(meth)acrylate. Those may be used alone or in a combination of two or more. Especially, from the viewpoint of an ability to copolymerize with other acrylic monomers, 2-hydroxypropyl(meth)acrylate and 2-hydroxyethyl(meth)acrylate are preferred.

A monomer having a hydroxyl group is preferred to be contained at 0.1 mol % or greater in 100 mol % of the acrylic monomer mixture (a) because excellent adhesiveness to a substrate is achieved even when the heating temperature is lower and the heating time is shorter. To maintain the physical properties of a plastisol composition, the content is preferred to be 15 mol % or less. Most preferably, the content is 1.0 mol % or greater and 10 mol % or less.

In addition to the monomer having a hydroxyl group, examples of a monomer contained in the acrylic monomer mixture (a) are (meth)acrylic acid esters such as methyl (meth)acrylate, butyl(meth)acrylate, 2-ethylhexyl(meth) acrylate, octyl(meth)acrylate, 2-acetoacetoxyethyl(meth) acrylate, dimethylaminoethyl(meth)acrylate, diethylaminoethyl(meth)acrylate and the like; unsaturated carboxylate such as vinyl acetate; unsaturated carboxylic acid such as (meth)acrylic acid; acrylonitrile, acrylamide and the like. Those may be used alone or in a combination of two or more. Here, "(meth)acrylate" is referred to both as acrylate and methacrylate.

From the viewpoint of the ease of adjusting compatibility with a plasticizer, acrylic monomer mixture (a) is preferred to contain methyl methacrylate and/or butyl methacrylate. The total amount of methyl methacrylate and butyl methacrylate is preferred to be 55 mol % or greater in 100 mol % of acrylic monomer mixture (a). Also, the molar ratio of methyl methacrylate and butyl methacrylate is preferred to be 20/80~75/25. Moreover, from the viewpoint of storage stability, t-butyl methacrylate is preferred to be contained as methyl methacrylate at 10 mol % or greater.

Acrylic monomer mixture (a) may also contain a monomer other than an acrylic monomer. Specific examples are aromatic vinyl compounds such as styrene, α-methyl styrene, vinyl toluene and divinylbenzene; and substituted ethylene compounds such as vinyl chloride and vinylidene chloride.

To polymerize acrylic monomer mixture (a) in step (1), any known polymerization method may be employed. Especially, from the viewpoint of stable polymerization, emulsion polymerization is preferred. Emulsion polymerization is conducted using an emulsifier by a known method. As for the emulsifier, an anionic surfactant or a nonionic surfactant is used, for example.

Specific examples of an anionic surfactant are alkylbenzene sulfonate, alkyl sulfonate, alkyl sulfate, metal salts of fatty acids, polyoxyalkyl ether sulfate, polyoxyethylene carboxylic acid ester sulfate, polyoxyethylene alkylphenyl ether sulfate, and succinic acid dialkyl ester sulfonate. Those can be used alone or in a combination of two or more.

Specific examples of a nonionic surfactant are compounds having a polyoxyethylene chain in the molecule with active surfactant properties such as polyoxyethylene alkyl phenyl ether, polyoxyethylene alkyl ether, polyoxyethylene fatty acid ester, polyoxyethylene sorbitan fatty acid, polyoxyethylene alkyl ether glycerol borate, polyoxyethylene alky ether phosphate, and polyoxyethylene; compounds in which the polyoxyethylene chain of the above compounds is replaced with a copolymer of oxyethylene and oxypropylene; sorbitan fatty acid ester, glycerol ester of fatty acid, glycerol fatty acid ester, and pentaerythritol fatty acid ester. Those may be used alone or in a combination of two or more. The amount of a surfactant to be used is preferred to be 0.1-5 parts by mass based on 100 parts by mass of acrylic monomer mixture (a).

As for a polymerization initiator for polymerization of acrylic monomer mixture (a), for example, hydrogen peroxides, water-soluble inorganic peroxides, or a combination of water-soluble reducing agents and organic peroxides may be used.

Specific examples of a water-soluble inorganic peroxide are potassium persulfate and ammonium persulfate. They may be used alone or in combination thereof. The amount of water-soluble inorganic peroxide to be used is 0.01-0.5 parts by mass based on 100 parts by mass of acrylic monomer mixture (a). Specific examples of a water-soluble reducing agent are ethylenediaminetetraacetic acid and its sodium salts or potassium salts; complex compounds of such salts with metals such as iron, copper and chrome; sulfinic acid and its sodium salts or potassium salts; L-ascorbic acid and its sodium salts or potassium salts; calcium salts; ferrous pyrophosphate; ferrous sulfate; ferrous ammonium sulfate; sodium sulfite; sodium disulfite; sodium formaldehyde sulfoxylate; reducing sugar and the like. Those may be used alone or in a combination of two or more.

Specific examples of an organic peroxide are hydroperoxides such as cumene hydroperoxide, p-cymene hydroperoxide, t-butylisopropylbenzene hydroperoxide, diisopropylbenzene hydroperoxide, p-menthane hydroperoxide, decalin hydroperoxide, t-amyl hydroperoxide, t-butyl hydroperoxide, and isopropyl hydroperoxide. Those may be used alone or in a combination of two or more.

The polymerization temperature for acrylic monomer mixture (a) may be set according to the type of a polymerization initiator, polymerization conditions and the like. For example, if a water-soluble inorganic peroxide such as potassium persulfate, ammonium persulfate or the like is used alone as a polymerization initiator, polymerization can progress if the temperature is set at a 10-hour half-life temperature of the polymerization initiator or higher. From the viewpoints of polymerization stability and reduction of time, the temperature is preferred to be set higher by 5 degrees or more than the 10-hour half-life temperature of the polymerization initiator.

The polymerization time for acrylic monomer mixture (a) is set according to the type of the polymerization initiator and polymerization conditions. Especially, the appropriate polymerization time differs depending on the polymerization temperature. In addition, it is necessary to carry out polymerization during the period in which pyrolysis of the polymerization initiator occurs and radicals are generated.

Emulsion polymerization of acrylic monomer mixture (a) may also be conducted in the presence of seed particles of a polymer. The polymer is produced by known methods such as soap-free polymerization, fine suspension polymerization and the like. Emulsion polymerization may be carried out by a one-step reaction or by multistep reactions.

A dispersion containing polymer (A) is obtained by emulsion polymerization of acrylic monomer mixture (a) as described above.

Step (2)

In step (2) of the present embodiment, acrylic monomer mixture (b) is polymerized in the dispersion containing polymer (A). Acrylic monomer mixture (b) used in step (2) contains a monomer having an acetoacetyl group or a blocked isocyanate group.

A monomer in which an acetoacetyl group is bonded to the alkyl group in the ester moiety of a (meth)acrylate (preferably, with 1-6 carbon atoms) may be used, for example, as a monomer having an acetoacetyl group. Specific examples are 2-acetoacetoxyethyl(meth)acrylate and 2-acetoacetoxypropyl(meth)acrylate. In addition, a monomer may also be used such as those where an alkyl group having an acetoacetyl group (preferably, with 1~6 carbon atoms) is bonded to a nitrogen atom of (meth)acrylamide. An alkyl group containing an acetoacetyl group may also contain other groups such as a cyano group and an amino group. Specific examples are 2-cyanoacetoacetoxyethyl methacrylate, N-(2-acetoxyaminoethyl)(meth)acrylamide, and the like. Another example is a monomer in which the ester moiety of acetoacetic ester is an ethylene hydrocarbon group (preferably, with 2~6 carbon atoms). Specific examples are allyl acetoacetate, vinyl acetoacetate and the like. Among those, 2-acetoacetoxyethyl(meth)acrylate is preferred because it is easier to copolymerize with an acrylic monomer.

A blocked isocyanate group is such a group that has a structure in which an isocyanate group is blocked with a blocking agent so as not to react with the free isocyanate group. An example of a monomer having a blocked isocyanate group is a monomer in which a group containing a blocked isocyanate group is bonded to the alkyl group (preferably, with 1≠6 carbon atoms) in the ester moiety of (meth)acrylate. Specific examples are 2-[(3,5-dimethylpyrazolyl)carbonylamino]ethyl methacrylate, 2-[0-(1'-methyl propylidene amino)carboxyamino]ethyl methacrylate and the like. Especially, from the viewpoint of stability of a blocking agent during polymerization, 2-[0-(1'-methyl propylidene amino)carboxyamino]ethyl methacrylate is preferred.

If the amount of a monomer containing an acetoacetyl group or a blocked isocyanate group is 0.7~15 mol % in 100 mol % of acrylic monomer mixture (b), it is preferred since excellent adhesiveness with the substrate is obtained even when the heating temperature is lower and the heating time is shorter. The viscosity of those reactive functional groups may increase due to crosslinking with the adhesive agent added to the plastisol composition or reactions of reactive functional groups. Thus, from the viewpoint of storage stability, the more preferable amount is 0.7~9.0 mol %.

Acrylic monomer mixture (b) may be any type as long as it includes a monomer having the aforementioned acetoacetyl group or blocked isocyanate group. As for acrylic monomers other than those having an acetoacetyl group or a blocked isocyanate group used in acrylic monomer mixture (b), the same as the acrylic monomers used for mixture (a) described earlier may be used.

Other than monomers having an acetoacetyl group or a blocked isocyanate group used for acrylic monomer mixture (b), acrylic monomers are preferred to be selected so that acrylic polymer (B) obtained in step (2) is made nearly incompatible with a plasticizer. That is because when a plastisol composition is prepared by adding a plasticizer to an acrylic polymer, if the acrylic polymer is nearly incompatible with the plasticizer, the storage stability of the plastisol composition is enhanced. For example, if diisononyl phthalate is used as a plasticizer, methyl(meth)acrylate, butyl(meth)acrylate, (meth)acrylic acid, or 2-hydroxylethyl methacrylate is preferred to be selected as the acrylic monomer.

Moreover, in the embodiments of the present invention, it is important for the value of solubility parameter (SA) of polymer (A) to be set different from the value of solubility parameter (SB) of polymer (B) obtained by polymerizing acrylic monomer mixture (b). By setting solubility parameter (SA) to be different from solubility parameter (SB), storage stability of the plastisol composition and the physical properties of the coated film after applying heat are both achieved. From the storage stability point of view, the value of solubility parameter (SB) is preferred to be greater than the value of solubility parameter (SA). Moreover, a greater difference between the values of solubility parameter (SB) and solubility parameter (SA) is preferred since the storage stability of the plastisol composition and the physical properties of the coated film are enhanced with respect to various plasticizers.

The value of the solubility parameter of the polymer (the SP value of the polymer) is obtained by formula (1) below.

$$SP \text{ value of polymer} = \sum_{i=1}^{n} (Mi \times Sp(ui)) \qquad (1)$$

(in the formula, "Mi" indicates the molar fraction of component "i" of the monomer unit, and $\Sigma mi=1$. Sp(ui) indicates the Sp value of component "i" of the monomer unit)

"Sp(ui)" can be obtained by the Fedors method described in "Polymer Engineering and Science," vol. 14, page 147 (1974). In Table 1 shown later, the Sp values (Sp(ui)) of the monomer units used in examples are shown.

The mass ratio (a)/(b) of acrylic monomer mixture (a) and acrylic monomer mixture (b) is preferred to be 70/30~95/5. If the percentage of acrylic monomer mixture (b) is 5 mass % or greater, polymer (A) is fully coated by polymer (B). Accordingly, the storage stability of a plastisol composition is enhanced even more. Also, if the ratio of acrylic monomer mixture (b) is 30 mass % or less, the flexibility of the coated film obtained using the plastisol composition is enhanced. Moreover, considering the tensile strength of the processed body such as coated film, the ratio of acrylic monomer mixture (b) is more preferred to be 15 mass % or less.

Polymerization of acrylic monomer mixture (b) in step (2) can be carried out by a known method the same as in step (1). Emulsion polymerization is especially preferred from the viewpoint of stability in polymerization.

Acrylic monomer mixture (b) may be added all at once to the dispersion containing polymer (A), or may be added by being divided into multiple portions. During that time, it is preferred to drop the mixture while stirring the dispersion.

When acrylic monomer mixture (b) is added to and combined with a dispersion containing polymer (A), it is preferred to be carried out in the presence of a polymerization inhibitor that temporarily inhibits polymerization reactions of acrylic monomer mixture (b). For example, the following methods may be employed: after polymerization reactions of acrylic monomer mixture (a) are finished in step (1), a polymerization inhibitor is added to a dispersion containing polymer (A) prior to adding acrylic monomer mixture (b) in step (2); or a polymerization inhibitor is combined with acrylic monomer mixture (b) in advance and then that mixture is added and combined with a dispersion containing polymer (A). Using a polymerization inhibitor, generation of radicals by a polymerization initiator and progression of polymerization reactions of acrylic monomer mixture (b) by the radicals are suppressed, during which time polymer (A) in the dispersion and acrylic monomer mixture (b) are homogeneously mixed. Then, after such homogeneous mixture is achieved, polymerization reactions of acrylic monomer mixture (b) start, and the surface of polymer (A) is uniformly coated by the polymer of acrylic monomer mixture (b).

Specific examples of a polymerization inhibitor are phenolic compounds such as hydroquinone, p-methoxyphenol and p-t-butylcatechol; hydroxylamine compounds such as N,N-diethylhydroxylamine and N-nitroso-phenylhydroxylamine ammonium salt (cupferron); and organosulfur compounds such as dithiobenzoyl disulfide and tetraethylthiuram disulfide. Those may be used alone or in a combination of two or more. It is especially preferred to use a polymerization inhibitor whose solubility in 25° C. water is 5 g/100 mL or lower. Examples of such a polymerization inhibitor are p-methoxyphenol, p-t-butylcatechol and diphenylamine.

The amount of a polymerization inhibitor may be determined according to the amount of the polymerization initiator that is present in the dispersion before adding the polymerization inhibitor. The ratio (Q/I) of molar amount (Q) of the polymerization inhibitor to the molar amount (I) of the polymerization initiator is preferred to be set at 0.1~30, more preferably at 0.1~27.5, especially preferably at 0.5~25. Setting at such a lower limit in each range is preferred, because generation of radicals by the polymerization initiator is suppressed for a certain period of time, the surface of polymer (A) is uniformly coated by the polymer of acrylic monomer mixture (b), and the storage stability of the plastisol composition is enhanced. In addition, setting at such an upper limit is preferred, because coating is achieved without terminating the polymerization of acrylic monomer mixture (b).

The molar amount (I) of a polymerization initiator in the dispersion containing polymer (A) is the remaining amount of the polymerization initiator used for polymerization of acrylic monomer mixture (a) in step (1), and is obtained by the formulas (i) and (ii) below.

$$kd(1/s) = A\exp(-\Delta E/RT) \qquad (i)$$

kd: pyrolysis rate constant of polymerization initiator
A: frequency factor (1/s) of polymerization initiator
ΔE: activation energy of polymerization initiator (J/mol)
R: gas constant (8.314 J/mol·K)
T: absolute temperature (K) of polymerization reaction $$\text{remaining rate (\%) of polymerization initiator} = \exp(-kdt) \times 100 \qquad (ii)$$

t=polymerization time (s)

Namely, first, the pyrolysis rate constant (kd) of a polymerization initiator at a polymerization temperature (T) for acrylic monomer mixture (a) is obtained by formula (i). Next, using formula (ii), the remaining rate of the polymerization initiator after the reaction time of t(s) is obtained under the condition of polymerization temperature (T). Then, the molar amount (I) of the polymerization initiator that is present in the dispersion is obtained from the amount of the polymerization initiator that has been used.

Frequency factor "A" and activation energy "ΔE" are constants specific to a polymerization initiator, and are obtained by the data described in "Polymer Articles" Vol. 32, No. 4, pp. 229~234 (1975). More specifically, if it is potassium persulfate, $A=2.87 \times 10^{16}$ (1/s), and ΔE=137937 (J/mol).

The volume average particle diameter of the acrylic polymer in the dispersion after the polymerization in step (2) is preferred to be 0.05~2 μm, more preferably 0.2~2 μm. The greater volume average particle diameter, namely, the smaller the surface area, indicates a higher degree of excellence in the storage stability of the plastisol composition.

[Acrylic Polymer]

The acrylic polymer in the dispersion after the polymerization in step (2) may be separated as a powder by a spray-dry method, or by drying after an acid or salt coagulation, for example. Especially, a spray-dry method is preferred, since primary particles do not form a fusion bonding between particles, but are easily made into primary particles by low shearing force.

The volume average particle diameter of the acrylic polymer obtained as above is preferred to be 5~200 μm. If the volume average particle diameter if 5 μm or greater, handling the polymer during the production of the plastisol composition is easier. In addition, if the diameter is 200 μm or smaller, the polymer in the plastisol composition is dispersed homogeneously, and the coating film is less likely to show spots or the like caused by poor dispersion of the polymer. Thus, the resultant appearance of the coated film is excellent.

The weight average molecular weight of the acrylic polymer obtained by GPC (gel permeation chromatography) is preferred to be 10,000 to 4,000,000, more preferably 50,000 to 3,000,000, especially preferably 30,000 to 2,000,000. Setting such an upper limit in each range is preferred since plasticizing with a plasticizer is easier and the obtained plastisol composition exhibits excellent processability. Also, setting such a lower limit is preferred because the storage stability of the plastisol composition is suppressed from lowering.

[Plastisol Composition]

A plastisol composition contains an acrylic polymer and a plasticizer, as described above. In addition, the plastisol composition may also contain a vinyl chloride resin, a filler, an adhesive agent or the like.

The amount of acrylic polymer in 100 mass % of a plastisol composition is preferred to be 5~70 mass %.

Specific examples of a plasticizer are phthalate-based plasticizers such as dimethyl phthalate, diethyl phthalate, dibutyl phthalate, diheptyl phthalate, di-2-ethylhexyl phthalate, dioctyl phthalate, diisononyl phthalate, diisodecyl phthalate, and butyl benzyl phthalate; adipate-based plasticizers such as dimethyl adipate, dibutyl adipate, diisobutyl adipate, dihexyl adipate, di-2-ethylhexyl adipate, diisononyl adipate, and dibutyl diglycol adipate; phosphate ester-based plasticizers such as trimethyl phosphate, triethyl phosphate, tributyl phosphate, tri-2-ethylhexyl phosphate, tributoxyethyl phosphate, triphenyl phosphate, tricresyl phosphate, trixylenyl phosphate, and cresyl phenyl phosphate; trimellitate-based plasticizers such as tri-2-ethylhexyl trimellitate, sebacate-based plasticizers such as dimethyl sebacate, dibutyl sebacate, and di-2-ethylhexyl sebacate; aliphatic polyester-based plasticizers such as poly-1,3-butanediol adipate; benzoic acid-based plasticizers such as diethylene glycol dibenzoate, and di-butylene glycol benzoate; epoxidized ester-based plasticizers such as epoxidized soybean oil; alkylsulfonic acid phenyl ester-based plasticizers such as alkyl sulfonic acid phenyl ester; alicyclic dibasic acid ester-based plasticizers; polyether-based plasticizers such as polypropylene glycol, and polybutylene glycol; citric acid-based plasticizers such as acetyl tributyl citrate. Those above may be used alone or in a combination of two or more. Especially, considering the cost and the ease of obtaining them, one or a combination of two or more of dioctyl phthalate, diisononyl phthalate, diisodecyl phthalate, alkylphenyl sulfate and acetyl tributyl citrate are preferred to be used as a main component.

Examples of a filler include calcium carbonate, aluminum hydroxide, colloidal silica, talc, glass powder, aluminum oxide and the like. The amount of such a filler may be appropriately selected according to usage purposes.

The adhesive may be appropriately selected depending on the type of the substrate. For example, if the substrate is an electrodeposition-coated plate or a steel plate, adhesives such as epoxy resin, block urethane resin and polyamine may be used. Those may be used alone or in a combination of two or more. Moreover, a hardening agent for the adhesive may also be added. For example, hardening agents such as anhydride, imidazole compounds and the like may be used for the epoxy-resin based adhesives, and hardening agents such as dihydrazide compounds may be used for blocked-urethane based adhesives.

In the plastisol composition, pigments such as titania and carbon black, diluents such as mineral turpentine and mineral spirits, antifoaming agents, antifungal agents, leveling agents and the like may be contained within a range that does not inhibit the above components.

A plastisol composition is produced by dispersing an acrylic polymer in a plasticizer, for example. Known mixers are used for such dispersion purposes. Specific examples are pony mixers, change-can mixers, Hobart mixers, planetary mixers, butterfly mixers, grinding machines, kneaders and the like.

A coating film using a plastisol composition is formed, for example, by a coating method such as dip coating and spray coating and then by baking the film.

EXAMPLES

In the following, the present invention is described in detail by referring to examples. The evaluation method and evaluation criteria for the examples are shown below. In the following, "part(s)" indicate "part(s) by mass."

[Adhesive Strength]

Two 70×25×0.8 mm cationic electrodeposition-coated plates (Paltec Test Panels, Co., Ltd.) were laminated, and a plastisol composition was coated to be a size of 25×25×3 mm in the center of the laminated plates. One test piece was prepared by applying heat at 140° C. for 20 minutes and another test piece was prepared by applying heat at 120° C. for 20 minutes. The two cationic electrodeposition-coated plates in those test pieces were pulled in a direction opposite the long axis under a condition of 23° C., and their shear bond strengths were each measured. A tensile tester (brand name: AG-IS 5KN, made by Shimadzu Corporation) was used at a test speed of 50 mm/min. In addition, the surface fracture after bonding testing was inspected visually and evaluated according to the following criteria.

○: Cohesive Failure (CF), indicating the surface fracture is observed within the sol.

Δ: Special Cohesive Failure (SCF), indicating part of the surface fracture is observed at the interface, or indicating an uneven fracture state.

x: Adhesive Failure (AF), indicating the surface fracture is observed at the interface between the sol and the electrodeposition-coated plate.

[Storage Stability]

Using a vacuum mixer, 100 parts of the acrylic polymer and 100 parts of diisononyl phthalate (J-Plus Co., Ltd.) as a plasticizer were mixed for 5 seconds under atmospheric pressure (0.1 MPa). Then, the mixture was further mixed for 115 seconds by reducing the pressure to 2.7 kPa, and a plastisol composition for evaluation of storage stability was obtained. The plastisol composition was incubated at 25° C. for 2 hours in a thermostatic vessel. Using a BH-type viscometer (Tokyo Keiki Inc.) with a No. 7 rotor set at a rotation speed of 20 rpm, the initial viscosity ($\alpha$) (Pa·s) was measured after one minute. The plastisol composition after the initial measurement was kept in a 40° C. atmosphere, and its viscosity ($\beta$) after 10 days was measured by the same method as that used for measuring the initial viscosity. Then, the rate (%) of increased viscosity was obtained from the formula: rate (%) of increased viscosity=[($\beta-\alpha$)/$\alpha$]×100, and an evaluation was conducted by the following criteria.

○: the viscosity increase was 200% or lower.

Δ: the viscosity increase exceeded 200% but was 600% or lower.

Example 1

Step 1

In a 2-liter four-neck flask equipped with a thermometer, nitrogen gas feed pipe, stirrer, dropping funnel and cooling pipe, 544 grams of ion-exchanged water was placed, nitrogen gas was fed for 30 minutes, and the remaining dissolved oxygen in the ion-exchanged water was displaced. Next, the nitrogen gas was turned off, and the temperature was raised to 80° C. while the ion-exchanged water was stirred at 200 rpm. When the inner temperature had reached 80° C., a monomer mixture (s) containing 26.1 grams of methyl methacrylate and 19.9 grams of n-butyl methacrylate was added all at once. Then, 0.40 grams of potassium persulfate and 16 grams of ion-exchanged water were added to carry out polymerization. Accordingly, polymer particles for seed particles were obtained.

After 45 minutes had elapsed, 0.32 grams of sodium dialkyl sulfosuccinate (brand name: Pelex OT-P, made by Kao Corporation) and 16.0 grams of ion-exchanged water were added. After another 15 minutes had elapsed, acrylic monomer mixture (a) containing 294.4 grams of methyl methacrylate (58.3 mol %), 278.5 grams of t-butyl methacrylate (38.3 mol %), 19.1 grams of 2-hydroxyethyl methacrylate (2.9 mol %), sodium dialkyl sulfosuccinate (brand name: Pelex OT-P) and 207.2 grams of ion-exchanged water was dropped out in four hours. Accordingly, polymerization was completed, and a dispersion containing polymer (A) was obtained.

Step 2

The dispersion containing polymer (A) obtained in step (1) above was kept at 80° C. for 60 minutes, and 24 mg of p-methoxyphenol as a polymerization inhibitor and 4 grams of ion-exchanged water were added. Here, the ratio (Q/I) of the molar amount (Q) of the polymerization inhibitor (p-methoxyphenol) added to the dispersion and the molar amount (I) of the polymerization initiator (potassium persulfate) remaining in the dispersion is 1.4. Also, shortly before adding the polymerization inhibitor, the reaction rate of acrylic monomer mixture (a) was 97%.

Here, the amount of the polymerization inhibitor (p-methoxyphenol) added above was calculated by formulas (i) and (ii) shown earlier. The following is a description of calculation steps. First, after a polymerization initiator (potassium persulfate) was added in step (1), the polymerization temperature was constant at 80° C. The polymerization inhibitor (p-methoxyphenol) was added 360 minutes after the polymerization initiator (potassium persulfate) had been added. The pyrolysis rate constant (Kd) of potassium persulfate at 80° C. is $1.11\times10^{-4}$, calculated using formula (I). Moreover, if 0.4 grams of potassium persulfate (molecular weight 270.3) is used to initiate polymerization at 80° C., the remaining rate of potassium persulfate after 360 minutes is 9.1%, according to formula (ii). Therefore, the remaining molar number of potassium persulfate at the time when the polymerization inhibitor was added is $1.35\times10^{-4}$ mol. In addition, since 24 mg of the polymerization inhibitor (p-methoxyphenol) (molecular weight 124.1) is $1.93 \times 10^{-4}$ mol, their molar ratio (Q/I) is 1.4.

Then, 5 minutes after the polymerization inhibitor was added, acrylic monomer mixture (b) containing 140.1 grams of methyl methacrylate (92.2 mol %), 10.5 grams of n-butyl methacrylate (4.9 mol %), 9.5 grams of 2-acetoxyethyl methacrylate (2.9 mol %), 1.6 grams of dialkyl sulfosuccinate (brand name: Pelex OT-P), and 56 grams of ion-exchanged water, was dropped out in 60 minutes. The mixture was stirred at 80° C. for 2 hours 30 minutes and a dispersion of acrylic polymer (P-1) was obtained. Polymerization was carried out while nitrogen gas was supplied at 25 mL/min. The dispersion of polymer (P-1) was spray-dried using an L-8 type spray dryer (made by Ohkawara Kakohki, Co., Ltd.) under the conditions of intake temperature/exit temperature=150/65° C. and number of revolutions of the disc at 20,000 rpm.

[Preparation of Plastisol Composition]

Using a vacuum mixer (brand name: ARV-200, made by Thinky) under atmospheric pressure (0.1 MPa) for 5 seconds, the following were mixed: 100 parts of calcium carbonate (brand name: NS #200, made by Nitto Funka Kogyo K.K.), 150 parts of surface-treated calcium carbonate (brand name: Hakuenka CCR, made by Shiraishi Kogyo, Ltd.), 200 parts of diisononyl phthalate as a plasticizer (made by J-Plus Co., Ltd.), 40 parts of block urethane resin (brand name: Adeka Resin QR-9428, made by Adeka Ltd.), 4.45 parts of a hardening agent (brand name: Adeka Hardener EH-4358S, made by Adeka Ltd.), and 3 parts of calcium oxide. Then, the mixture was stirred for 175 seconds after the pressure was reduced to 2.7 kPa. Accordingly, a kneaded material was obtained. Next, 100 parts of acrylic polymer (P-1) was added and mixed for 5 seconds under atmospheric pressure (0.1 MPa) using the vacuum mixer. Then, the mixture was stirred for 115 seconds after the pressure was reduced to 2.7 kPa. Accordingly, a plastisol composition was obtained. The physical properties of the plastisol composition were evaluated. The results are shown in Table 2.

Examples 2~14, Comparative Examples 1 and 2

Acrylic polymers (P-2)~(P-16) were each prepared the same as in Example 1 except that acrylic monomer mixture (a) and acrylic monomer mixture (b) were changed respectively as shown in Tables 2 and 3. A plastisol composition was prepared for each example and evaluated accordingly. The results are shown in Tables 2 and 3.

TABLE 1

|  | $Sp(ui)$ $(J/cm^3)^{1/2}$ |
|---|---|
| MMA | 20.32 |
| n-BMA | 19.32 |
| t-BMA | 18.56 |
| 2-HEMA | 27.55 |
| AAEM | 22.98 |
| Karenz MOI-BP | 23.24 |
| Karenz MOI-BM | 24.91 |

TABLE 2

| | | example 1 P-1 | | example 2 P-2 | | example 3 P-3 | | example 4 P-4 | |
|---|---|---|---|---|---|---|---|---|---|
| acrylic polymer | | g | mol % | g | mol % | g | mol % | g | mol % |
| acrylic monomer mixture (a) | MMA | 294.4 | 58.3 | 294.4 | 58.3 | 294.4 | 58.3 | 294.4 | 58.3 |
| | t-BMA | 278.5 | 38.8 | 278.5 | 38.8 | 278.5 | 38.8 | 278.5 | 38.8 |
| | 2-HEMA | 19.1 | 2.9 | 19.1 | 2.9 | 19.1 | 2.9 | 19.1 | 2.9 |
| acrylic monomer mixture (b) | MMA | 140.1 | 92.2 | 138.7 | 92.2 | 139.1 | 92.2 | 144.3 | 93.6 |
| | n-BMA | 10.5 | 4.9 | 10.4 | 4.9 | 10.4 | 4.9 | 10.8 | 4.9 |
| | AAEM | 9.5 | 2.9 | 0 | 0 | 0 | 0 | 4.9 | 1.5 |
| | Karenz MOI-BP | 0 | 0 | 11.0 | 2.9 | 0 | 0 | 0 | 0 |
| | Karenz MOI-BM | 0 | 0 | 0 | 0 | 10.5 | 2.9 | 0 | 0 |
| weight ratio of monomer mixtures (a/b) | | 79/21 | | 79/21 | | 79/21 | | 79/21 | |
| solubility parameter (SA) | | 19.85 | | 19.85 | | 19.85 | | 19.85 | |
| solubility parameter (SB) | | 20.35 | | 20.40 | | 20.35 | | 20.31 | |
| evaluation result | 140° C. adhesive strength (MPa) | 1.4 | | 1.1 | | 1.1 | | 1.6 | |
| | failure pattern | CF(○) | | CF(○) | | CF(○) | | CF(○) | |
| | 120° C. adhesive strength (MPa) | 1.1 | | 1.2 | | 1.1 | | 1.4 | |
| | failure pattern | CF(○) | | CF(○) | | CF(○) | | CF(○) | |
| | initial viscosity (Pa·s) | 20 | | 24 | | 21 | | 23 | |
| | rate of increased viscosity 40° C., 10 days | 70(○) | | 75(○) | | 147(○) | | 70(○) | |

| | | example 5 P-5 | | example 6 P-6 | | example 7 P-7 | | example 8 P-8 | |
|---|---|---|---|---|---|---|---|---|---|
| acrylic polymer | | g | mol % | g | mol % | g | mol % | g | mol % |
| acrylic monomer mixture (a) | MMA | 294.4 | 58.3 | 332.0 | 57.9 | 332.0 | 57.9 | 332.0 | 57.9 |
| | t-BMA | 278.5 | 38.8 | 314.1 | 38.6 | 314.1 | 38.6 | 314.1 | 38.6 |
| | 2-HEMA | 19.1 | 2.9 | 25.9 | 3.5 | 25.9 | 3.5 | 25.9 | 3.5 |
| acrylic monomer mixture (b) | MMA | 128.7 | 88.4 | 67.0 | 91.7 | 64.2 | 89.6 | 72.3 | 95.2 |
| | n-BMA | 9.6 | 4.7 | 0 | 0 | 0 | 0 | 0 | 0 |
| | AAEM | 22 | 7.0 | 13.0 | 8.3 | 15.8 | 10.4 | 7.7 | 4.8 |
| | Karenz MOI-BP | 0 | 0 | 0 | 0 | 0 | 0 | 0 | 0 |
| | Karenz MOI-BM | 0 | 0 | 0 | 0 | 0 | 0 | 0 | 0 |
| weight ratio of monomer mixtures (a/b) | | 79/21 | | 89/11 | | 89/11 | | 89/11 | |
| solubility parameter (SA) | | 19.85 | | 19.89 | | 19.89 | | 19.89 | |
| solubility parameter (SB) | | 20.46 | | 20.54 | | 20.59 | | 20.44 | |

TABLE 2-continued

| evaluation result | 140° C. adhesive strength (MPa) | 1.5 | 1.5 | 1.5 | 1.5 |
|---|---|---|---|---|---|
| | failure pattern | CF(○) | CF(○) | CF(○) | CF(○) |
| | 120° C. adhesive strength (MPa) | 1.3 | 1.5 | 1.2 | 1.2 |
| | failure pattern | CF(○) | CF(○) | CF(○) | CF(○) |
| | initial viscosity (Pa · s) | 28 | 18 | 19 | 23 |
| | rate of increased viscosity 40° C., 10 days | 122(○) | 102(○) | 502(Δ) | 24(○) |

TABLE 3

| | | example 9 P-9 | | example 10 P-10 | | example 11 P-11 | | example 12 P-12 | |
|---|---|---|---|---|---|---|---|---|---|
| | acrylic polymer | g | mol % | g | mol % | g | mol % | g | mol % |
| acrylic monomer mixture (a) | MMA | 299.2 | 59.1 | 280.8 | 55.8 | 260.7 | 55.2 | 294.4 | 58.3 |
| | t-BMA | 283.1 | 39.4 | 265.6 | 37.2 | 246.6 | 34.8 | 278.5 | 38.8 |
| | 2-HEMA | 9.7 | 1.5 | 45.6 | 7.0 | 84.7 | 13.0 | 19.1 | 2.9 |
| acrylic monomer mixture (b) | MMA | 140.1 | 92.2 | 140.1 | 92.2 | 140.1 | 92.2 | 145.8 | 94.0 |
| | n-BMA | 10.5 | 4.9 | 10.5 | 4.9 | 10.5 | 4.9 | 10.9 | 5.0 |
| | AAEM | 9.5 | 2.9 | 9.5 | 2.9 | 9.5 | 2.9 | 3.3 | 1.0 |
| | Karenz MOI-BP | 0 | 0 | 0 | 0 | 0 | 0 | 0 | 0 |
| | Karenz MOI-BM | 0 | 0 | 0 | 0 | 0 | 0 | 0 | 0 |
| weight ratio of monomer mixtures (a/b) | | 79/21 | | 79/21 | | 79/21 | | 79/21 | |
| solubility parameter (SA) | | 19.73 | | 20.17 | | 20.65 | | 19.85 | |
| solubility parameter (SB) | | 20.35 | | 20.35 | | 20.35 | | 20.29 | |
| evaluation result | 140° C. adhesive strength (MPa) | 1.4 | | 1.8 | | 0.6 | | 1.4 | |
| | failure pattern | CF(○) | | CF(○) | | AF(X) | | CF(○) | |
| | 120° C. adhesive strength (MPa) | 1.5 | | 1.9 | | 1.3 | | 1.4 | |
| | failure pattern | CF(○) | | CF(○) | | SCF(Δ) | | CF(○) | |
| | initial viscosity (Pa · s) | 23 | | 28 | | 25 | | 22 | |
| | rate of increased viscosity 40° C., 10 days | 78(○) | | 86(○) | | 70(○) | | 65(○) | |

| | | example 13 P-13 | | example 14 P-14 | | comp. example 1 P-15 | | comp. example 2 P-16 | |
|---|---|---|---|---|---|---|---|---|---|
| | acrylic polymer | g | mol % | g | mol % | g | mol % | g | mol % |
| acrylic monomer mixture (a) | MMA | 292.5 | 57.9 | 294.4 | 58.3 | 294.4 | 58.3 | 304.2 | 60.0 |
| | t-BMA | 276.7 | 38.6 | 278.5 | 38.8 | 278.5 | 38.8 | 287.8 | 40.0 |
| | 2-HEMA | 22.8 | 3.5 | 19.1 | 2.9 | 19.1 | 2.9 | 0 | 0 |
| acrylic monomer mixture (b) | MMA | 145.8 | 94.0 | 147.3 | 94.5 | 148.9 | 95.0 | 140.1 | 92.2 |
| | n-BMA | 10.9 | 5.0 | 11.0 | 5.0 | 11.1 | 5.0 | 10.5 | 4.9 |
| | AAEM | 3.3 | 1.0 | 1.7 | 0.5 | 0 | 0 | 9.5 | 2.9 |
| | Karenz MOI-BP | 0 | 0 | 0 | 0 | 0 | 0 | 0 | 0 |
| | Karenz MOI-BM | 0 | 0 | 0 | 0 | 0 | 0 | 0 | 0 |
| weight ratio of monomer mixtures (a/b) | | 79/21 | | 79/21 | | 79/21 | | 79/21 | |
| solubility parameter (SA) | | 19.89 | | 19.85 | | 19.85 | | 19.61 | |
| solubility parameter (SB) | | 20.29 | | 20.28 | | 20.27 | | 20.35 | |
| evaluation result | 140° C. adhesive strength (MPa) | 1.2 | | 1.1 | | 1.1 | | 0.9 | |
| | failure pattern | CF(○) | | CF(○) | | CF(○) | | CF(○) | |
| | 120° C. adhesive strength (MPa) | 1.5 | | 1.0 | | 1.1 | | 0.9 | |
| | failure pattern | CF(○) | | SCF(Δ) | | AF(X) | | AF(X) | |
| | initial viscosity (Pa · s) | 24 | | 23 | | 26 | | 24 | |
| | rate of increased viscosity 40° C., 10 days | 57(○) | | 63(○) | | 109(○) | | 79(○) | |

The abbreviations in the tables indicate the following compounds respectively:

"MMA": methyl methacrylate (made by Mitsubishi Rayon Co., Ltd.)
"t-BMA": t-butyl methacrylate (made by Mitsubishi Rayon Co., Ltd.)
"2-HEMA": 2-hydroxyethyl methacrylate (made by Mitsubishi Rayon Co., Ltd.)
"n-BMA": n-butyl methacrylate (made by Mitsubishi Rayon Co., Ltd.)
"AAEM": 2-acetoacetoxyethyl methacrylate (Nippon Synthetic Chemical Industry Co., Ltd.)
"Karenz MOI-BP": 2-[(3,5-dimethylpyrazolyl)carbonylamino]ethyl methacrylate (made by Showa Denko K.K.)
"Karenz MOI-BM": 2-[0-(1'-methylpropylideneamino) carboxyamino]ethyl methacrylate (made by Showa Denko K.K.)

As shown in Tables 2 and 3, plastisol compositions of Examples 1~14 each exhibited excellent adhesiveness to the coated plate and excellent storage stability even when the applied temperature was low (heat applied at 120° C. for 20 minutes). On the other hand, in the plastisol composition in Comparative Example 1 prepared without using a monomer containing an acetoacetyl group or a blocked isocyanate group, the adhesive surface fracture was observed at the interface and the adhesiveness was low when heat was applied at 120° C. for 20 minutes. Also, in Comparative Example 2 prepared without using a monomer containing a hydroxide group, the adhesive surface fracture was observed at the interface and the adhesiveness was low when heat was applied at 120° C. for 20 minutes.

The invention claimed is:

1. A method for producing an acrylic polymer, the method comprising:
   polymerizing an acrylic monomer mixture (a) to obtain a polymer (A);
   and polymerizing, an acrylic monomer mixture (b) in a dispersion comprising, the polymer (A),
   wherein
   the acrylic monomer mixture (a) comprises a monomer having a hydroxyl group,
   the acrylic monomer mixture (b) comprises a monomer having an acetoacetyl group or a blocked isocyanate group, and
   a solubility parameter (SA) of the polymer (A) is different from a solubility parameter (SB) of a polymer (B) obtained by polymerizing the acrylic monomer mixture (b)
   wherein the acrylic monomer mixture (b) comprises the monomer having an acetoacetyl group or a blocked isocyanate group in an amount of 0.7 to 15 mol % based on 100 mol % of the acrylic monomer mixture (b),
   wherein the acrylic monomer mixture (a) comprises the monomer having a hydroxyl group in an amount of 0.1 to 15 mol % based on 100 mol % of the acrylic monomer mixture (a), and
   wherein the acrylic monomer mixture (a) further comprises methyl methacrylate, butyl methacrylate, or a combination thereof in a total amount of 55 mol % or greater based on 100 mole of the acrylic monomer mixture (a).

2. The method of claim 1, wherein the monomer having a hydroxyl group is a (meth)acrylic acid ester having a hydroxyl group.

3. The method of claim 1, wherein the monomer having a hydroxyl group is at least one monomer selected from the group consisting of 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and dipentaerythritol hexa(meth)acrylate.

4. The method of claim 1, wherein the monomer having a hydroxyl group is at least one monomer selected from the group consisting of 2-hydroxyethyl (meth)acrylate and 2-hydroxypropyl (meth)acrylate.

5. The method of claim 1, wherein the acrylic monomer mixture (a) comprises the monomer having a hydroxyl group in an amount of 0.1 to 10 mol % based on 100 mol % of the acrylic monomer mixture (a).

6. The method of claim 1, wherein the acrylic monomer mixture (a) further comprises methyl methacrylate and butyl methacrylate in a molar ratio within a range of 20:80 to 75:25.

7. The method of claim 1, wherein the acrylic monomer mixture (b) comprises a monomer having an acetoacetyl group.

8. The method of claim 1, wherein the acrylic monomer mixture (b) comprises a monomer having a blocked isocyanate group.

9. The method of claim 7, wherein the monomer having an acetoacetyl group is at least one monomer selected from the group consisting of 2-acetoacetoxyethyl (meth)acrylate, 2-acetoacetoxypropyl (meth)acrylate, 2-cyanoacetoacetoxyethyl methacrylate, N-(2-acetoxyaminoethyl) (meth)acrylamide, allyl acetoacetate, and vinyl acetoacetate.

10. The method of claim 8, wherein the monomer having a blocked isocyanate group is at least one monomer selected from the group consisting of 2-[(3,5-dimethylpyrazolyl)carbonylamino]ethyl methacrylate and 2[O-(1'-methyl propylidene amino)carboxyamino]ethyl methacrylate.

11. The method of claim 1, wherein the acrylic monomer mixture (b) comprises the monomer having an acetoacetyl group or a blocked isocyanate group in an amount of 0.7 to 9 mol % based on 100 mol % of the acrylic monomer mixture (b).

* * * * *